(12) United States Patent
Mizoguchi

(10) Patent No.: US 11,345,349 B2
(45) Date of Patent: May 31, 2022

(54) AUTOMATIC DRIVING ASSIST APPARATUS

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 309 days.

(21) Appl. No.: 16/673,336

(22) Filed: Nov. 4, 2019

(65) Prior Publication Data

US 2020/0180639 A1   Jun. 11, 2020

(30) Foreign Application Priority Data

Dec. 10, 2018   (JP) .............................. JP2018-230984

(51) Int. Cl.
*B60W 30/18*   (2012.01)
*G05D 1/02*   (2020.01)
*G05D 1/00*   (2006.01)

(52) U.S. Cl.
CPC ..... *B60W 30/18163* (2013.01); *G05D 1/0088* (2013.01); *G05D 1/0214* (2013.01); *B60W 2554/00* (2020.02); *G05D 2201/0213* (2013.01)

(58) Field of Classification Search
CPC ........ B60W 30/18163; B60W 2554/00; G05D 1/0088; G05D 1/0214; G05D 2201/0213
See application file for complete search history.

(56) References Cited

FOREIGN PATENT DOCUMENTS

JP    2013-050397 A    3/2013
WO   WO-2017187882 A1 * 11/2017   ....... G08G 1/096725

\* cited by examiner

*Primary Examiner* — Michael D Lang
(74) *Attorney, Agent, or Firm* — McDermott Will & Emery LLP

(57) ABSTRACT

An automatic driving assist apparatus includes a traveling environment information acquiring unit, a map locator calculator, a traffic information acquiring unit, and a traveling controller. The traveling controller examines whether the map locator calculator sets a target travel path to a branch lane direction from a main lane, examines whether a lane restricted section is set before an entrance of a main lane continuing to a branch lane, based on information obtained by the traveling environment information acquiring unit and road traffic information obtained by the traffic information acquiring unit, and examines whether traffic jam from the branch lane extends to the main lane. When the target travel path is set to the branch lane direction and the lane restricted section is set before the entrance of the main lane, the own vehicle is made to change the lane to an adjacent lane before the lane restricted section starts.

7 Claims, 11 Drawing Sheets

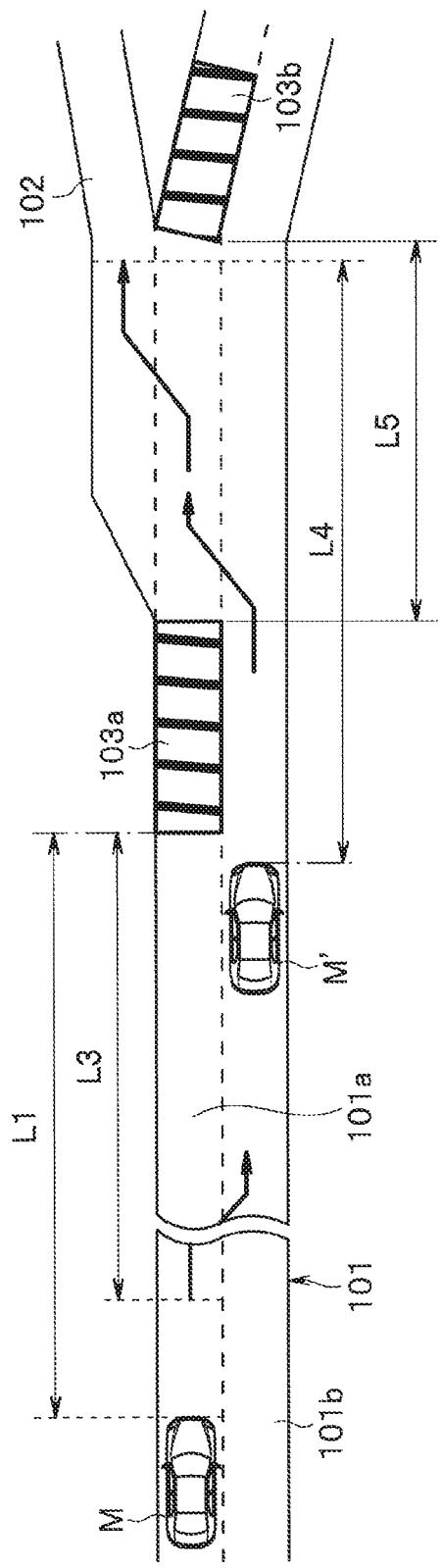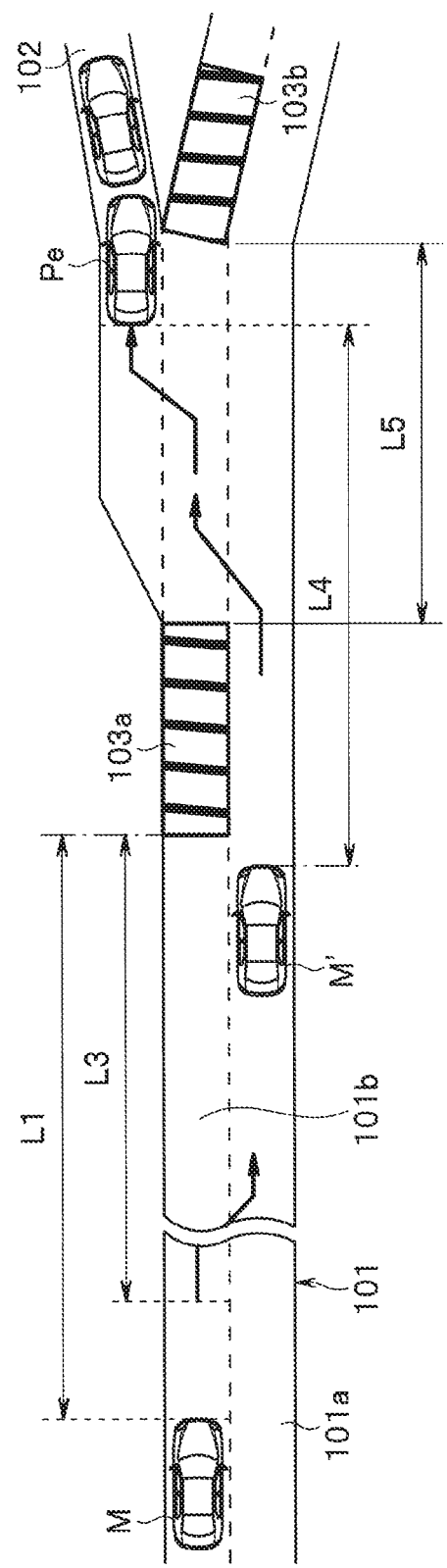

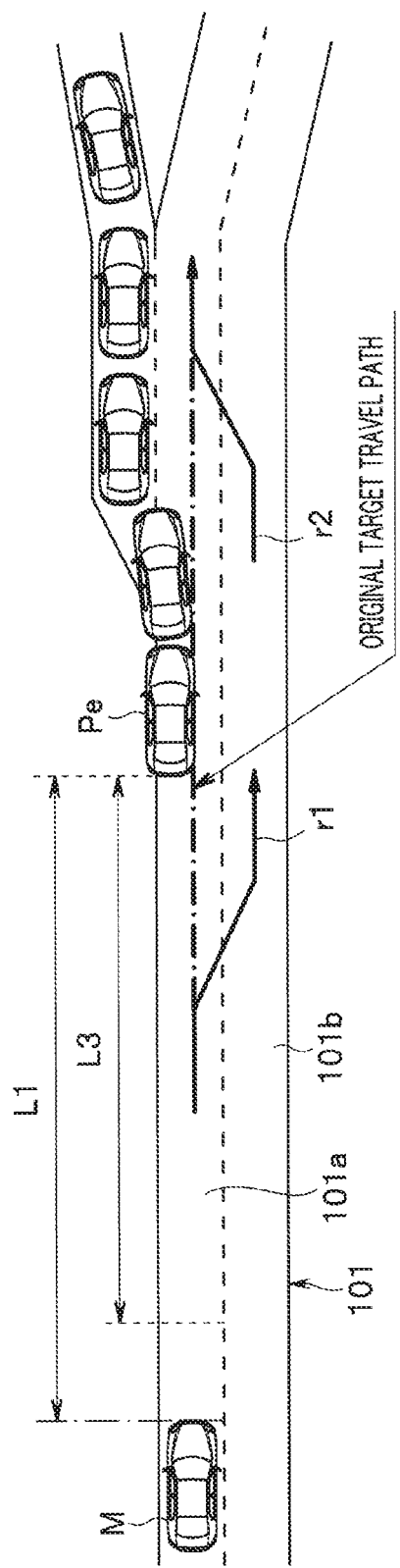

AUTOMATIC DRIVING ASSIST APPARATUS

CROSS-REFERENCE TO RELATED APPLICATIONS

The present application claims priority from Japanese Patent Application No. 2018-230984 filed on Dec. 10, 2018, the entire contents of which are hereby incorporated by reference.

BACKGROUND

The technology relates to an automatic driving assist apparatus which executes traveling control according to a traveling direction of an own vehicle by obtaining information on a traffic jam on a branch lane continuing to a main lane on which the own vehicle is running or a lane restricted section set in a vicinity of an entrance to the branch lane.

When a target travel path on which the own vehicle is to be automatically driven is set to a branch lane direction from a lane (traveling lane) on which the own vehicle is currently traveling, the automatic driving assist apparatus, first, causes the own vehicle to change the lane to the traveling lane connected to the branch lane and then, to change the lane to the branch lane side.

At that time, the automatic driving assist apparatus obtains, from an external traffic control apparatus, road traffic information (traffic jam information, for example) on the branch lane direction, and if a traffic jam row continues to the traveling lane, lane change is performed when a distance from the own vehicle to an end of the traffic jam row reaches a lane change section. When a preceding-vehicle following distance is reached, the own vehicle is decelerated by braking control, and well-known Adaptive Cruise Control (ACC) is executed, with the vehicle at the end of the traffic jam row as the preceding vehicle.

FIG. 7 in Japanese Unexamined Patent Application Publication (JP-A) No. 2013-050397 discloses a technology that, when a traffic jam occurs from a branch point where the own vehicle is to make a right or left turn, the own vehicle is caused to follow the end of the traffic jam row by changing the lane before the end of the traffic jam.

SUMMARY

An aspect of the technology is an automatic driving assist apparatus including a traveling environment information acquiring unit that is mounted on an own vehicle and obtains traveling environment information ahead of the own vehicle, a map locator calculator that sets a target travel path, a traffic information acquiring unit that obtains, from an external traffic control apparatus, road traffic information of the target travel path set by the map locator calculator in order to cause the own vehicle to automatically travel, and a traveling controller that executes traveling control for causing the own vehicle to travel along the target travel path.

The traveling controller includes a travel path determining unit that examines whether the target travel path is set to a branch lane direction from a main lane, a lane restriction determining unit that examines whether a lane restricted section is set before an entrance of the main lane continuing to the branch lane, based on the traveling environment information obtained by the traveling environment information acquiring unit or the road traffic information obtained by the traffic information acquiring unit, a traffic jam determining unit that examines whether the traffic jam from the branch lane extends to the main lane, based on the traveling environment information obtained by the traveling environment information acquiring unit or the road traffic information obtained by the traffic information acquiring unit, a lane change controller that causes the own vehicle to change the lane to an adjacent lane before the lane restricted section starts when the travel path determining unit determines that the target travel path is set to the branch lane direction and the lane restriction determining unit determines that the lane restricted section is set before the entrance of the main lane, and a traffic-jam following controller that causes the own vehicle to execute following control with a vehicle at an end of the traffic jam as a preceding vehicle when the traffic jam determining unit determines that the traffic jam from the branch lane extends to the main lane.

An aspect of the technology is an automatic driving assist apparatus including circuitry which is mounted on an own vehicle and obtains traveling environment information ahead of the own vehicle, sets a target travel path, obtains, from an external traffic control apparatus, road traffic information of the target travel path in order to cause the own vehicle to automatically travel, and executes traveling control for causing the own vehicle to travel along the target travel path. The circuitry examines whether the target travel path is set to a branch lane direction from a main lane, examines whether a lane restricted section is set before an entrance of the main lane continuing to the branch lane, based on the traveling environment information or the road traffic information, examines whether the traffic jam from the branch lane extends to the main lane, based on the traveling environment information or the road traffic information, and cause the own vehicle to change the lane to an adjacent lane before the lane restricted section starts when the circuitry determines that the target travel path is set to the branch lane direction and that the lane restricted section is set before the entrance of the main lane, and cause the own vehicle to execute following control with a vehicle at an end of the traffic jam as a preceding vehicle, when the circuitry determines that the traffic jam from the branch lane extends to the main lane.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 1B is an explanatory view illustrating a concept of a dynamic map;

FIG. 9A is an explanatory view illustrating timing for a lane change to the branch lane direction when a lane restricted section is set in a vicinity of an entrance of the branch lane set as the target travel path;

FIG. 9B is an explanatory view illustrating the timing for the lane change if there is a traffic jam in the branch lane direction when the lane restricted section is set in the vicinity of the entrance of the branch lane set as the target travel path;

FIG. 11 is an explanatory view illustrating the traveling control when the target travel path is straight and there is a traffic jam in the branch lane direction connected to the traveling lane.

DETAILED DESCRIPTION

Figure 1A:
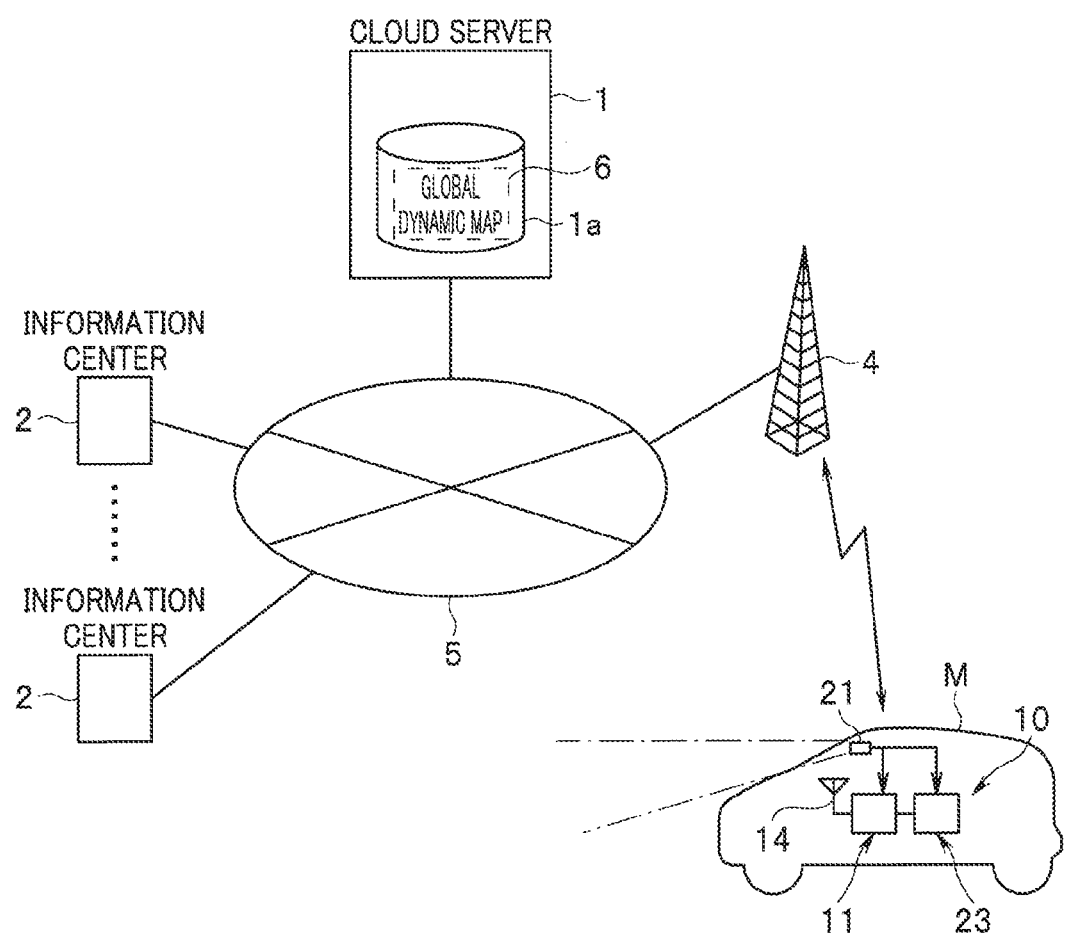
FIG. 1A is a schematic configuration diagram illustrating a map information providing system.

In the following, some embodiments of the disclosure are described in detail with reference to the accompanying drawings.

Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

Since a traffic jam row is moving at a low speed, if an own vehicle gets closer to an end of the traffic jam row, Adaptive Cruise Control (ACC) can be executed with a vehicle at the end of the traffic jam row as a preceding vehicle as disclosed in the aforementioned document and thus, traveling along a target travel path can be performed.

However, if a lane restricted section (accident handling section, a road construction section and the like) is set before an entrance connected to a branch lane side of a traveling lane, for example, since the lane restricted section is a fixed object on the target travel path, when a start position of the lane restricted section is recognized, the own vehicle is decelerated by automatic brake control and then, the own vehicle is halted before the start position of the lane restricted section in the ACC control.

After the own vehicle is halted before the start position of the lane restricted section, the own vehicle cannot travel along the target travel path and thus, the automatic driving is temporarily stopped, and a driving operation is taken over to a driver. Alternatively, the lane change is performed by temporarily stopping the automatic driving by steering override by the driver before the own vehicle is stopped.

Then, the own vehicle is caused to change the lane to a lane adjacent to the lane restricted section by a steering operation of the driver, and after the lane restricted section is detoured, lane change to the branch lane is performed by the steering operation of the driver.

When the traveling environment information acquiring unit which is mounted on the own vehicle and obtains traveling environment information ahead of the vehicle recognizes the start position of the lane restricted section and deceleration is to be started, the automatic driving is stopped by notifying the driver of the deceleration, halt, and stop of the automatic driving only through sound or display on a monitor. Therefore, the driver needs to avoid the lane restricted section by his/her steering operation, which possibly gives feeling of cumbersomeness to the driver in some cases.

Thus, in the technology, it is desirable to provide an automatic driving assist apparatus which can smoothly lead the own vehicle to the branch lane direction by detouring the lane restricted section without stopping the automatic driving, and cumbersomeness felt by the driver can be alleviated, even if the target travel path of the own vehicle is set to the branch lane direction from the traveling lane and the lane restricted section is set on the target travel path before the branch lane.

An embodiment of the technology will be described below based on the drawings. A map information providing system illustrated in FIG. 1A has a cloud server 1 as an external traffic control apparatus and each of traffic information centers 2, and a base station 4 and is configured by connecting them through the Internet 5. The cloud server 1 has a map database 1*a*, and a global dynamic map 6 is stored in this map database 1*a*. The cloud server 1 delivers information (map information) of the global dynamic map 6 stored in the map database 1*a* to each vehicle (in the figure, an own vehicle M is illustrated as a representative) from the base station 4.

Each of the traffic information centers 2 is in the jurisdiction of private and public institutions, collects constantly-changing traffic information and environment information and transmits the collected information to the cloud server 1, as traffic information. The private traffic information center, for example, collects probe traffic information (traffic jam and congestion information generated from vehicle speed, weather information from wiper use frequency and the like) received from each of contracted vehicles and transmits the collected probe traffic information to the cloud server 1. Moreover, the traffic information center of public institutions, for example, collects traffic information obtained from various sensors installed in roads in advance, prefectural polices, road traffic managers and the like and transmits the collected traffic information to the cloud server 1.

The cloud server 1 processes the traffic information received in a time series from each of the traffic information centers 2 on a real-time basis and integrally manages the road traffic information stored in the global dynamic map 6 by sequentially updating it. As illustrated in FIG. 1B, the global dynamic map 6 specifically has a structure of four layers in which additional map information required for supporting automatic driving is superposed on a base of a static information layer 6*a* on a lowermost layer.

The static information layer 6*a* is high-precision three-dimensional map information and a base information layer on the lowermost layer in which static information with smallest change, such as road information, lane information, intersection information, three-dimensional structures, permanent restriction information and the like is stored. The additional map information superposed on the static information layer 6*a* is divided into three layers, that is, a quasi-static information layer 6*b*, a quasi-dynamic information layer 6*c*, and a dynamic information layer 6*d* in this order from a lower layer.

The layers 6*a* to 6*d* are divided in accordance with a degree of change (variation) on a time axis, and the information in each of the layers 6*a* to 6*d* is sequentially updated in each period (time) determined in advance. That is, since the information in the static information layer 6*a* has small change, the information is updated in a cycle within one month. In the quasi-static information layer 6*b*, information on the state of matters to be changed is scheduled or predicted in advance is stored. The information has more changes than the information in the static information layer 6*a* but has the smallest change among the information in the dynamic information layers. The information includes a schedule of lane restriction due to a construction work, seasonal scheduled restriction for events, traffic jam prediction, wide-area weather forecast, and the like. Since this quasi-static information has smaller dynamic change, it is updated in a cycle within one hour.

In the quasi-dynamic information layer 6*c*, information on unpredictable phenomenon not scheduled or predicted with more dynamic changes than the information in the quasi-static information layer 6*b* is stored. The information includes accident information, traffic jam information, local-area weather information such as unexpectedly strong rainfall, for example. Since the quasi-dynamic information has more dynamic changes, it is updated in a cycle within one minute.

In the dynamic information layer 6*d*, information with the most changes and needed to be updated on the real-time basis is stored. Such information is obtained on the real-time basis by inter-vehicle communication, road-vehicle communication, and pedestrian-vehicle communication. The information includes signal indication (lighted color) information, railroad crossing gate information, information on vehicle traveling straight in intersection, information on pedestrian/bicycle in intersection and the like. Since the dynamic information needs to be obtained on the real-time basis, it is updated in a cycle within one second. Note that attributes of the information stored in each of the information layers 6*a* to 6*d* of the global dynamic map 6 are exemplification and not limited thereto.

The information of the global dynamic map 6 stored in the map database 1*a* of the aforementioned cloud server 1 is delivered to each vehicle from each of the base stations 4. An automatic driving assist apparatus 10 for automatic driving is mounted on the own vehicle M. The automatic driving assist apparatus 10 includes a locator unit 11 as a locator, a camera unit 21 as the traveling environment information acquiring unit, and a vehicle controller 23.

Figure 2:
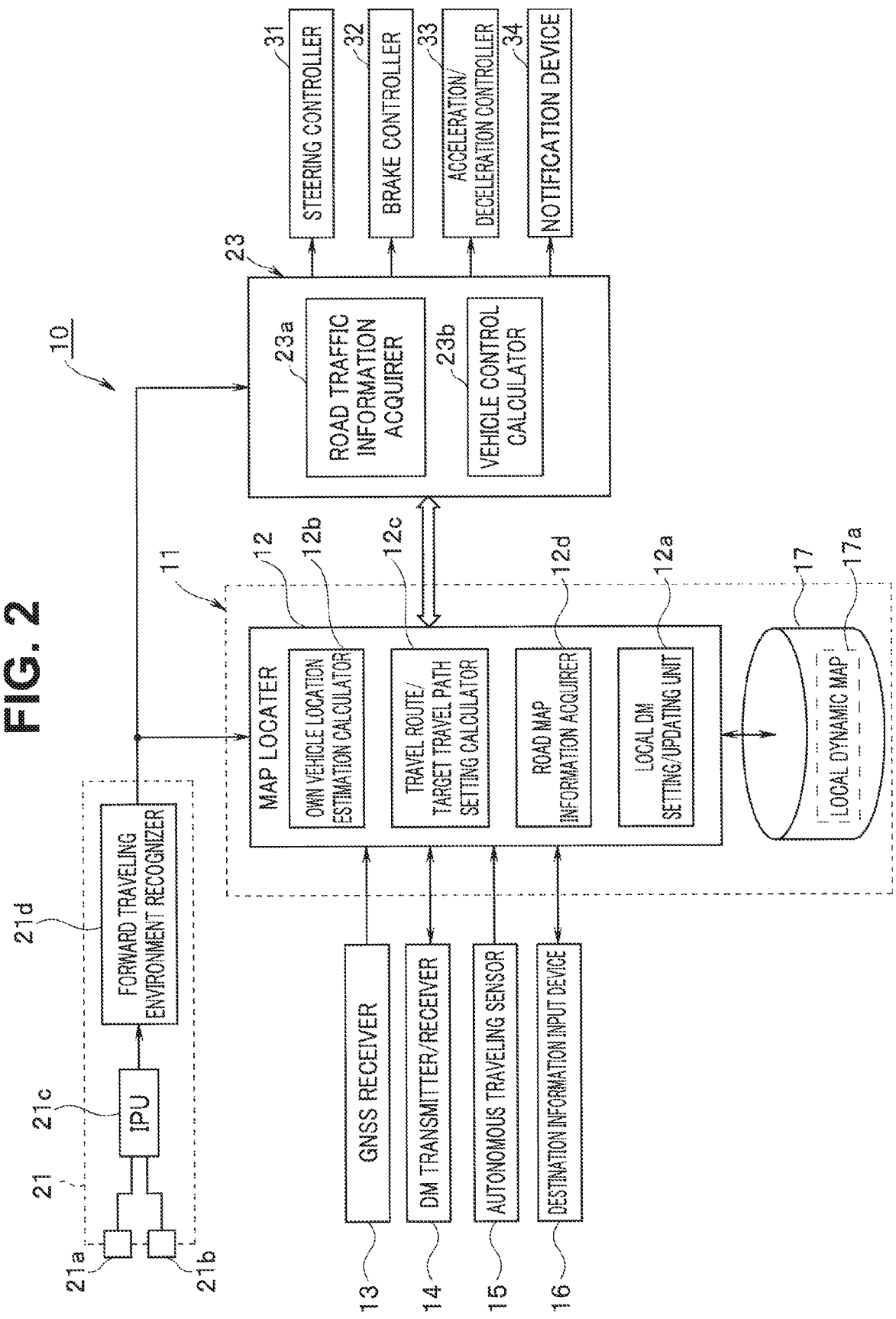
FIG. 2 is a schematic configuration diagram illustrating an automatic driving assist apparatus.
Figure 3:
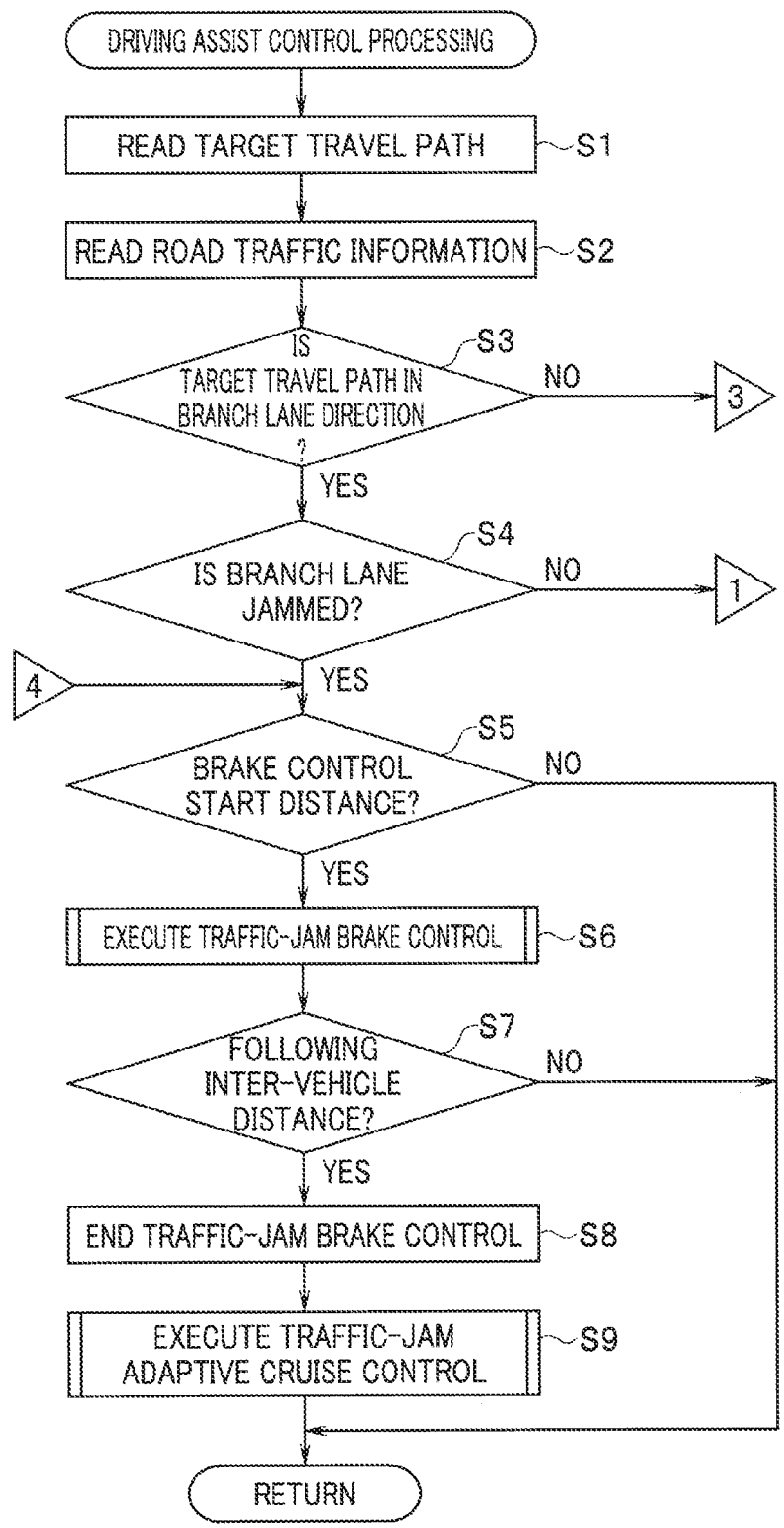
FIG. 3 is a flowchart (No. 1) illustrating a driving assist control processing routine.
Figure 4:
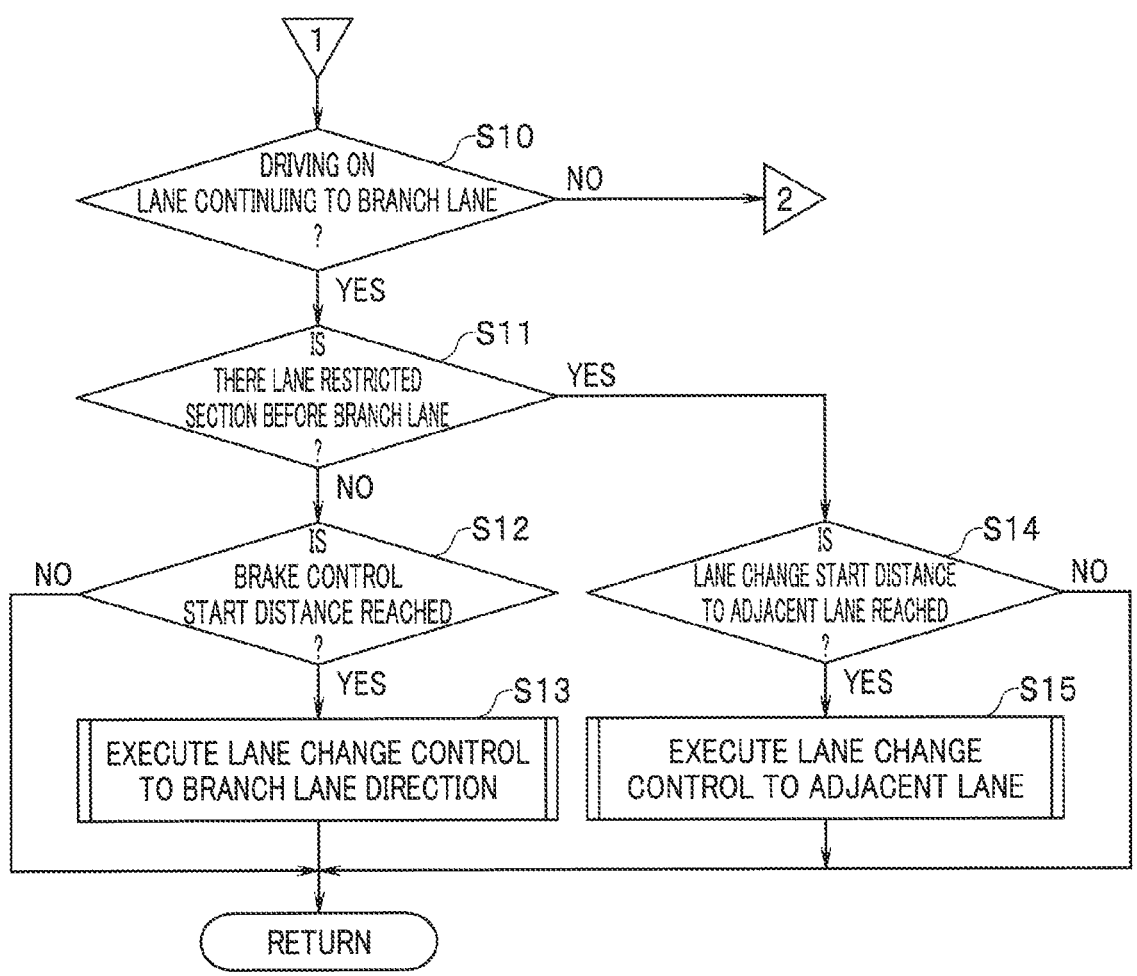
FIG. 4 is a flowchart (No. 2) illustrating the driving assist control processing routine.
Figure 5:
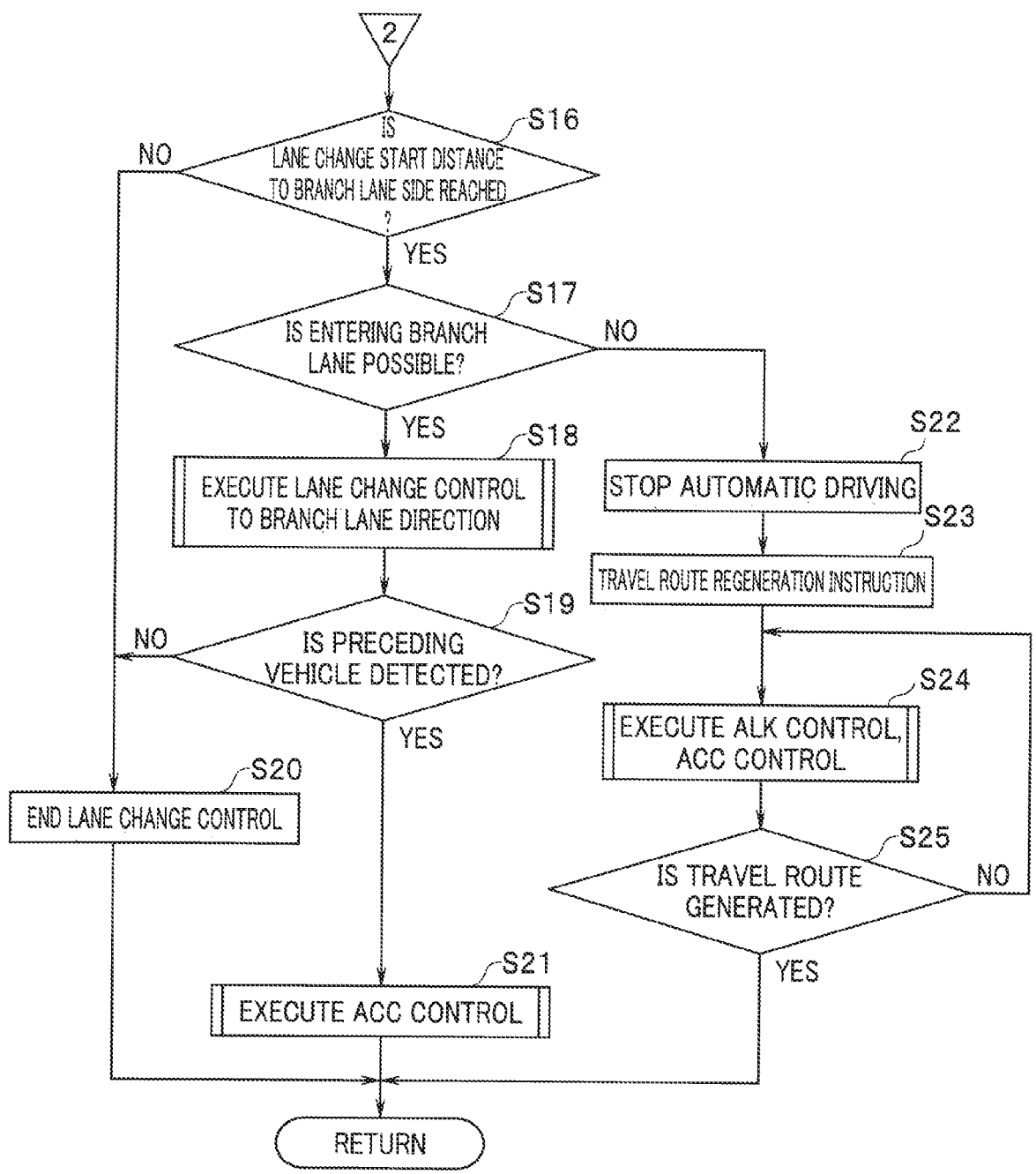
FIG. 5 is a flowchart (No. 3) illustrating the driving assist control processing routine.
Figure 6:
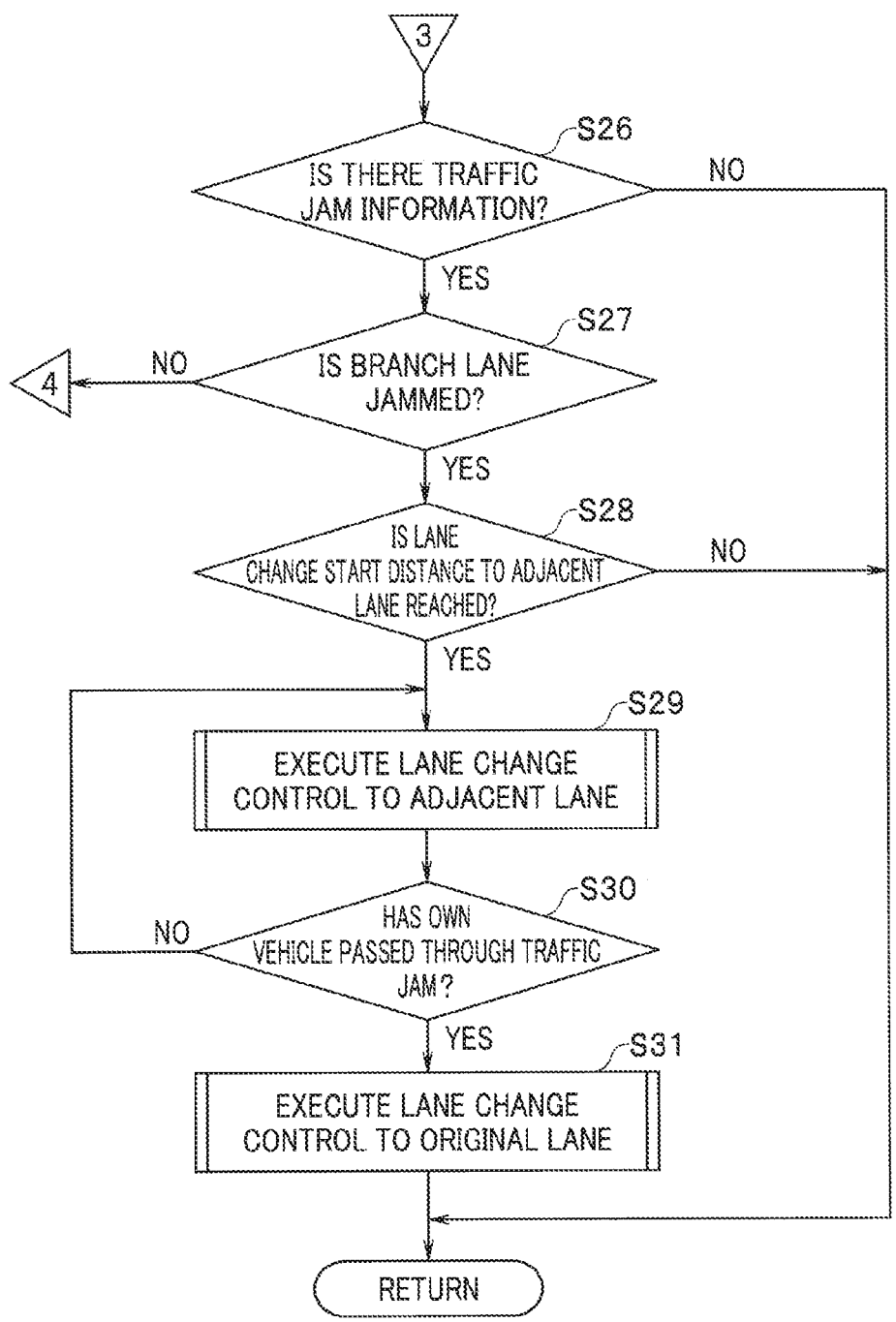
FIG. 6 is a flowchart (No. 4) illustrating the driving assist control processing routine.

As illustrated in FIG. 2, the locator unit 11 has a map locator calculator 12 as a map locator calculating unit and a map database 17 configured by a large-capacity storage medium such as an HDD. The map locator calculator 12, a forward traveling environment recognizer 21*d* which will be described later, and the vehicle controller 23 are configured by a well-known microcomputer including a CPU, RAM, ROM and the like and its peripheral equipment, and fixed data such as a program executed by the CPU and the like are stored in the ROM in advance. Moreover, a local dynamic map 17*a* is stored in the map database 17. The local dynamic map 17*a* is a dynamic map of a local area required when the own vehicle M is to automatically travel and has a layered structure similar to that of the global dynamic map 6 illustrated in the aforementioned FIG. 1B.

Moreover, a Global Navigation Satellite System (GNSS) receiver 13, a DM (dynamic map) transmitter/receiver 14, an autonomous traveling sensor 15, a destination information input device 16, and the forward traveling environment recognizer 21*d* of the camera unit 21 which will be described later are coupled with an input side of the map locator calculator 12.

The GNSS receiver 13 receives positioning signals transmitted from a plurality of positioning satellites. The DM transmitter/receiver 14 accesses the cloud server 1, requests transmission of the map information stored in the global dynamic map 6, and receives the transmitted map information.

The autonomous traveling sensor 15 enables autonomous traveling in an environment such as traveling in a tunnel in which a reception sensitivity from the GNSS satellite is low, and a positioning signal cannot be effectively received and is configured by a vehicle speed sensor, a gyro sensor, a forward/backward acceleration sensor and the like. The map locator calculator 12 performs localization from a moving distance and an azimuth based on a vehicle speed detected by the vehicle speed sensor, an angular speed detected by the gyro sensor, the forward/backward acceleration detected by the forward/backward acceleration sensor and the like.

The destination information input device 16 is an external input device which causes a driver who is an operator to input destination information (address, telephone number, facility name and the like) by a monitor operation, voice and the like. Note that when the destination information is input, the map locator calculator 12 sets a travel route from a current own vehicle's location to the destination. A transit point can be set by operating the destination information input device 16.

The map locator calculator 12 includes a local dynamic map setting/updating unit 12*a*, an own vehicle location estimation calculator 12*b*, a travel route/target travel path setting calculator 12*c*, and a road map information acquirer 12*d*.

The local dynamic map setting/updating unit 12*a* downloads the static information in the static information layer 6*a* of the global dynamic map 6 stored in the map database 1*a* of the cloud server 1 in a predetermined cycle (a cycle within one month, for example) and updates the information in the static information layer of the local dynamic map 17*a* of the map database 17 with the information in the static information layer 6*a*. The travel route from the own vehicle's location to the destination in a case of the automatic driving is set based on the static information in the static information layer on the lowermost layer which is a base. Therefore, the static information in the static information layer is wholly updated with the static information in the static information layer 6*a*.

On the other hand, each of the dynamic information in the quasi-static information layer 6*b*, the quasi-dynamic information layer 6*c*, and the dynamic information layer 6*d* has only to include the information along the target travel path which will be described later, and thus, only the dynamic information of a local area limited to the vicinity of the own vehicle's location and to the vicinity of the target travel path is downloaded.

The own vehicle location estimation calculator 12*b* obtains a position coordinate (latitude, longitude) which is position information of the own vehicle M based on the positioning signal received by the GNSS receiver 13. In an environment where the effective positioning signal from the positioning satellite cannot be received due to lowered sensitivity of the GNSS receiver 13, the position coordinate of the own vehicle M is estimated based on the signal from the autonomous traveling sensor 15.

The travel route/target travel path setting calculator 12c performs map matching with the static information layer 6a of the local dynamic map 17a based on the position coordinate (latitude, longitude) of the own vehicle M estimated by the own vehicle location estimation calculator 12b and the destination information (transit point information, when necessary) received by the destination information input device 16 and specifies the own vehicle's location and the destination (the transit point, if the transit point is set). Then, the travel route connecting the own vehicle's location and the destination (via the transit point when the transit point is set) is created based on the static information in the static information layer 6a.

After that, the target travel path on which the own vehicle M automatically travels along a traveling lane 101a of the main lane 101 (see FIGS. 8 to 11) is created on the travel route for a preset distance of several to several tens of kilometers ahead, with the own vehicle's location as a start point. If the destination information has not been input from the destination information input device 16, a straight lane for which lane keep (Active Lane Keep: ALK) control is executed may be set as the target travel path.

Then, the map information on the vicinity of the own vehicle's location and on the vicinity of the target travel path is requested from the local dynamic map setting/updating unit 12a. The local dynamic map setting/updating unit 12a accesses the cloud server 1, downloads the map information on a corresponding specific area from the dynamic information in the global dynamic map 6 (the quasi-static information layer 6b, the quasi-dynamic information layer 6c, and the dynamic information layer 6d), and sequentially updates the information in each of the information layers in the local dynamic map 17a.

The road map information acquirer 12d constructs a dynamic map of the vicinity of the own vehicle's location and the vicinity of the target travel path by combining the quasi-static information layer 6b, the quasi-dynamic information layer 6c, and the dynamic information layer 6d with the static information layer of the vicinity of the own vehicle's location and the vicinity of the target travel path stored in the local dynamic map 17a.

On the other hand, the camera unit 21 is fixed to a center on an upper part of a front part in a cabin of the own vehicle M and has an onboard camera (stereo camera) made of a main camera 21a and a sub camera 21b disposed at symmetric positions with a center in a vehicle width direction between them, an image processing unit (IPU) 21c, and a forward traveling environment recognizer 21d. Then, the traveling environment information ahead of the own vehicle M obtained by the both cameras 21a and 21b is image-processed in a predetermined way by the IPU 21c.

The forward traveling environment recognizer 21d reads the traveling environment image information image-processed in the IPU 21c and recognizes the forward traveling environment based on the traveling environment image information. The forward traveling environment includes a road shape of the travel path (travel path of the own vehicle) on which the own vehicle M is traveling (a road curvature at a center of lane lines marking left and right and a width (lane width) between left and right lane lines), an intersection, signal indication (lighted color), a road sign, and a roadside obstacle (an electric pole, a telegraph pole, a guardrail, a fence, a parked vehicle and the like).

The forward traveling environment recognized by the forward traveling environment recognizer 21d is read by the local dynamic map setting/updating unit 12a and updates the map information of the dynamic information (the quasi-static information layer, the quasi-dynamic information layer, the dynamic information layer) stored in the local dynamic map 17a of the map database 17 on the real-time basis. Therefore, since sequential update is performed also by the information obtained by the forward traveling environment recognizer 21d of the camera unit 21 (information that the traffic jam extending to the traveling lane 101a of a main lane 101 from the direction of a branch lane 102 which is a target travel path has been cleared, that the lane restriction has been already cancelled, that the traffic jam caused by the lane restriction has been cleared, or that the end of the traffic jam extends to the own vehicle M side or the like), the latest road map information is obtained at all times in the dynamic map of the vicinity of the own vehicle's location and the vicinity of the target travel path read by the road map information acquirer 12d.

Moreover, the vehicle controller 23 includes a road traffic information acquirer 23a as a traffic information acquiring unit and a vehicle control calculator 23b as a traveling controller, and the forward traveling environment recognizer 21d of the camera unit 21 is coupled with an input side of the vehicle controller 23. On the other hand, a steering controller 31 which causes the own vehicle M to travel along the target travel path set along the traveling lane 101a of the main lane 101, a brake controller 32 which decelerates the own vehicle M by forced brake control, an acceleration/deceleration controller 33 which controls a vehicle speed of the own vehicle M, and a notification device 34 such as a monitor, a speaker and the like, which notifies the driver of switching of a driving mode or the like visually and audibly, are coupled with an output side of this vehicle controller 23. Moreover, the vehicle controller 23 and the map locator calculator 12 are coupled through an in-vehicle communication line (Controller Area Network: CAN, for example), in a bilateral communication available state.

The road traffic information acquirer 23a obtains the road traffic information (traveling vehicles in the vicinity of the own vehicle M, an intersection ahead, a signal indication (lighted color), a road sign, a roadside obstacle and the like and position information on the lane restricted section caused by a construction work, an accident or the like, traffic jam information and the like) as the environment information from the dynamic map (local dynamic map) on the target travel path constructed in the road map information acquirer 12d.

The vehicle control calculator 23b causes the own vehicle to automatically travel along the target travel path by controlling the steering controller 31, the brake controller 32, and the acceleration/deceleration controller 33 in a predetermined way. At that time, the vehicle control calculator 23b executes the ACC control and the ALK control based on the local dynamic map constructed on the target travel path by the road map information acquirer 12d and the forward traveling environment recognized by the forward traveling environment recognizer 21d, and if a preceding vehicle is detected, the own vehicle is caused to follow the preceding vehicle, while if a preceding vehicle is not detected, the own vehicle is caused to travel at a set vehicle speed (however, an upper limit is a regulation speed).

Moreover, if the target travel path on which the own vehicle M is to automatically travel along the traveling lane 101a based on the road traffic information on the vicinity of the own vehicle and the vicinity of the target travel path obtained by the road traffic information acquirer 23a is set to the direction of the branch lane 102 connecting the traveling lane 101a and an exit of the main lane or another main lane, the vehicle control calculator 23b calculates timing when the own vehicle M is made to change the lane from the traveling lane 101a to the direction of the branch lane 102.

Figure 8:
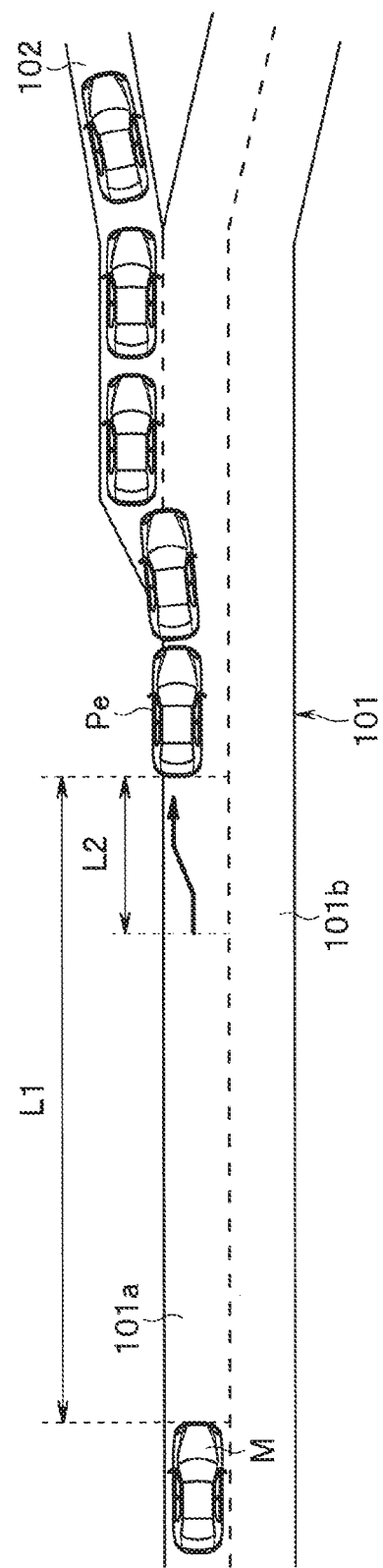
FIG. 8 is an explanatory view illustrating the traveling control when there is a traffic jam in the branch lane direction set as the target travel path.

At that time, if a traffic jam occurs in the branch lane 102 as illustrated in FIG. 8, and the vehicle at the end of the traffic jam comes to the traveling lane 101a side of the main lane 101, the ACC control is executed in the own vehicle M with respect to the vehicle at the end as a preceding vehicle Pe. Moreover, if a lane restricted section 103a (see FIG. 9) is set to the traveling lane 101a before an entrance of the branch lane 102, lane change timing to an adjacent lane (passing lane 101b in FIG. 8) is set with the start position of the lane restricted section 103a as a reference. When the own vehicle M performs the lane change from the passing lane 101b to the branch lane 102, as illustrated in FIGS. 9A and 9B, first, lane change to the traveling lane 101a is performed, and then, lane change to the branch lane 102 side is performed. Therefore, as illustrated in FIGS. 9A and 9B, if a lane restricted section 103b is set also to ahead of the entrance of the branch lane 102, an interval between the both lane restricted sections 103a and 103b (set interval) L5 needs to have a distance in which the own vehicle M can change the lane from the traveling lane 101a to the branch lane 102 side.

Driving assist for the own vehicle M executed by the vehicle control calculator 23b is specifically executed in accordance with a driving assist control processing routine illustrated in FIGS. 3 to 6. Note that, in the following, a case where left-hand traffic is regulated for the main lane 101, and the main lane 101 has two lanes, that is, the traveling lane 101a and the passing lane 101b is exemplified. Therefore, on the road for which right-hand traffic is regulated (main lane 101), the right side reads the left side and the left side reads the right side in application. In a case of three lanes, the passing lane 101b reads a center traveling lane 101b in application.

In the routine, first, at step S1, the target travel path set in the travel route/target travel path setting calculator 12c in the map locator calculator 12 is read. Subsequently, the routine proceeds to step S2, and the road traffic information on the vicinity of the own vehicle's location and on the vicinity of the target travel path obtained by the road traffic information acquirer 23a (traveling vehicles in the vicinity of the own vehicle M, a roadside obstacle, position information on the lane restricted section caused by a construction work, an accident or the like, traffic jam information and the like) is read.

After that, the routine proceeds to step S3, and examination is made on whether the target travel path is set to a junction connecting the main lane 101 on which the own vehicle M is currently traveling and another main lane or to the branch lane 102 direction such as an exit lane connected to the main lane 101. If the target travel path is set to the branch lane 102 direction, the routine proceeds to step S4. If the target travel path passes the branch lane 102 and is set in a straight travel path, the routine jumps to step S26. Note that the processing at step S3 corresponds to a travel path determining unit of the technology.

In the following, first, a case where the target travel path is set to the branch lane direction will be described and then, a case where the target travel path is set to the straight traveling direction will be described.

When the routine proceeds to step S4, whether the branch lane is jammed is examined based on the road traffic information read at step S2. As described above, the target travel path is set to several to several tens of kilometers ahead of the current position of the own vehicle M, and the traffic jam information of the branch lane 102 which cannot be recognized by the traveling environment image information obtained by the camera unit 21 is determined on the real-time basis based on the road traffic information. If it is determined that the branch lane 102 is jammed, the routine proceeds to step S5. If it is determined that the branch lane 102 is not jammed, the routine branches to step S10. The processing at the step S4 corresponds to a traffic-jam determining unit of the technology.

If it is determined that the branch lane direction set as the target travel path of the own vehicle M is jammed and the routine proceeds to step S5, whether a reaching distance (distance) L1 from the own vehicle M to the target spot has reached a brake control start distance L2 (see FIG. 8) is examined. The brake control start distance L2 is a distance where the own vehicle M starts the brake control with respect to the vehicle (Pe) at the end of the traffic jam.

The target spot is a target position where the own vehicle M is to reach and is set to the vehicle (Pe) at the end of the traffic jam at step S5. Moreover, the reaching distance L1 is acquired from the traveling environment image information obtained by the camera unit 21. At that time, if the vehicle (Pe) at the end of the traffic jam cannot be recognized yet from the traveling environment image information obtained by the camera unit 21, the reaching distance L1 is calculated based on the position coordinate of the own vehicle M estimated in the own vehicle location estimation calculator 12b of the map locator calculator 12 and the position coordinate of the vehicle (Pe) at the end of the traffic jam obtained from the road traffic information.

If the reaching distance L1 has not reached the brake control start distance L2 (L1>L2), the vehicle control calculator 23b exits the routine without doing anything. Note that the position of the vehicle at the end of the traffic jam changes every moment, and the traffic jam might be cleared when the own vehicle M has reached the entrance of the branch lane 102 in some cases. Conversely, the vehicle (Pe) at the end of the traffic jam might be backed up further toward the own vehicle side in the traveling lane 101a from the entrance of the branch lane 102 in some cases.

Thus, the reaching distance L1 is calculated based on the latest road traffic information at every calculation cycle. Note that if the preceding vehicle is traveling between the vehicle (Pe) at the end of the traffic jam and the own vehicle M, the ACC control is executed in the own vehicle M with respect to the preceding vehicle.

When the reaching distance L1 has reached the brake control start distance L2 (L1≤L2), the routine proceeds to step S6, the traffic-jam brake control is executed, and the routine proceeds to step S7. The traffic-jam brake control is executed based on the traveling environment image information obtained by the camera unit 21, and the brake controller 32 and the acceleration/deceleration controller 33 are operated to decelerate the own vehicle until the interval from the own vehicle to the vehicle at the end of the traffic jam becomes a following inter-vehicle distance set in advance.

Then, when the routine proceeds to step S7, whether the own vehicle M has reached the following inter-vehicle distance set in advance for the preceding vehicle Pe at the end of the traffic jam is examined, and if the distance has not been reached yet, the vehicle control calculator 23b exits the routine. On the other hand, if the following inter-vehicle distance is reached, the routine proceeds to step S8, the traffic-jam brake control is finished, and the routine proceeds to step S9. At step S9, the traveling control is taken over by traffic-jam adaptive cruise control from the brake control executed at step S8, and then, the vehicle control calculator 23b exits the routine. Note that the processing at steps S6 to S9 corresponds to a traffic-jam following controller of the technology.

As illustrated in FIG. 8, vehicles in the traffic jam which are to change the lane to the direction of the branch lane 102 generally form a vehicle row on the left side of the traveling lane 101a and drive slowly (traveling by repeating halt and start in a short time) subsequent to the preceding vehicle. The traffic-jam adaptive cruise control is following traveling performed during such slow driving. More specifically, the steering controller 31, the brake controller 32, and the acceleration/deceleration controller 33 are operated, and the own vehicle M executes the steering control that, with the vehicle at the end of the traffic jam as the preceding vehicle Pe, the center in the vehicle width direction is matched with the center in the vehicle width direction of the own vehicle M for the preceding vehicle Pe.

As described above, if the target travel path is set to the branch lane 102 direction from the traveling lane 101a, the branch lane 102 is jammed, and the vehicle (Pe) at the end is backed up in the direction of the traveling lane 101a, the following traveling is performed for the vehicle (Pe) at the end of the traffic jam by the traffic-jam adaptive cruise control so as to continue the automatic driving and thus, favorable traveling performances can be obtained.

On the other hand, if it is determined at the aforementioned step S4 that the branch lane 102 is not jammed and the routine branches to step S10, whether the own vehicle M is traveling on the lane continuing to the branch lane 102 is examined. On which lane the own vehicle M is traveling can be specified by performing map-matching of the position coordinate of the own vehicle M estimated by the own vehicle location estimation calculator 12b with the road map information read at step S2. Then, whether the lane on which the own vehicle M is traveling is the lane continuing to the branch lane 102 can be examined by collating the target travel path set on the road map and the traveling lane of the own vehicle M. In this case, the lane on which the own vehicle M is traveling may be recognized based on the traveling environment image information obtained by the camera unit 21.

Figure 7:
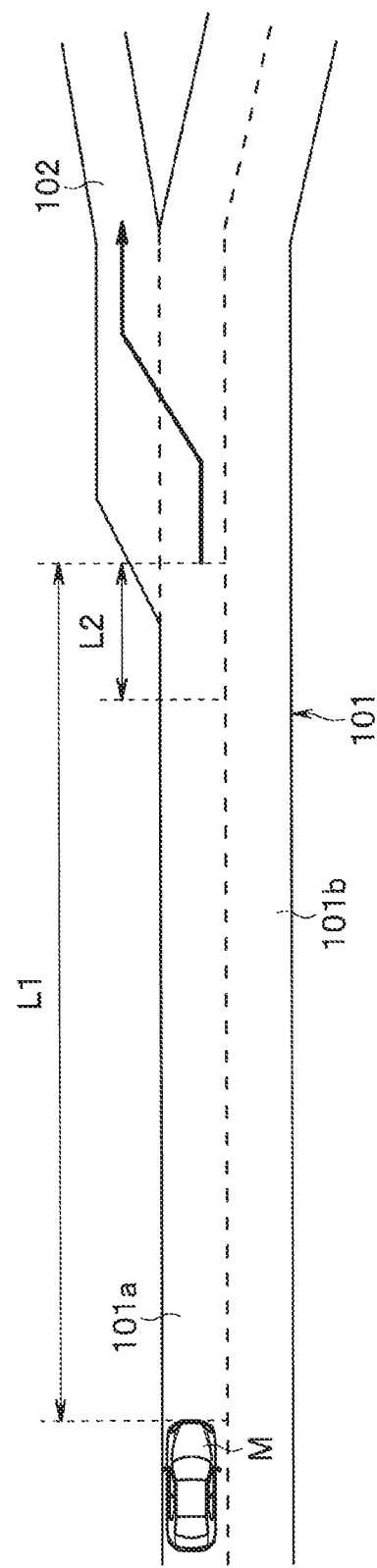
FIG. 7 is an explanatory view illustrating traveling control when a target travel path is set to a branch lane direction from a traveling lane.

If there are two main lanes 101 and the branch lane 102 is connected to the traveling lane 101a as illustrated in FIG. 7, the lane continuing to the branch lane 102 is the traveling lane 101a, and the adjacent lane is the passing lane 101b. Hereinafter, description will be made with the lane of the main lane 101 continuing to the branch lane 102 as the "traveling lane 101a" and the adjacent lane as the "passing lane 101b" for convenience.

When the own vehicle M is to change the lane from the traveling lane 101a to the branch lane 102, the lane change can be accomplished by one route change as indicated by the arrow in FIG. 7. On the other hand, if the own vehicle M is to change the lane from the passing lane 101b to the branch lane 102 direction as illustrated in FIG. 9, since the own vehicle M needs to travel on the traveling lane 101a once, the route change needs to be performed twice. As a result, a distance required for the lane change becomes longer in the case of traveling on the passing lane 101b than the case of traveling on the traveling lane 101a.

Even if the own vehicle M is traveling on the traveling lane 101a as illustrated in FIG. 9, when the lane restricted section 103a is set before the entrance of the branch lane 102, the own vehicle M needs to change the lane once to the passing lane 101b side so as to detour the lane restricted section 103a and then, to change the lane to the branch lane 102 direction. Thus, at step S10, first, the lane on which the own vehicle M is traveling is grasped so that the lane change can be smoothly performed to the branch lane 102 direction in the subsequent processing.

Then, when it is determined that the own vehicle M is traveling on the traveling lane 101a, the routine proceeds to step S11. When it is determined that the own vehicle M is traveling on the lane (the passing lane 101b in FIG. 7) other than the traveling lane 101a, the routine branches to step S16.

At step S11, whether the section (lane restricted section) 103a in which the lane is restricted for accident handling, a construction work or the like is set to the traveling lane 101a before the entrance of the branch lane 102 is examined based on the road traffic information read at the aforementioned step S2. If it is determined that the lane restricted section 103a is set, the routine proceeds to step S12. If it is determined that the lane restricted section 103a is not set, the routine branches to step S14.

Note that the processing at the step S11 corresponds to the lane regulation determining unit of the technology.

At step S12, whether the reaching distance (distance) L1 from the own vehicle M to the target spot has reached the brake control start distance L2 for lane change to the branch lane 102 is examined. As illustrated in FIG. 7, the target spot is a spot where the lane change to the branch lane 102 is started at step S12 and is registered in the road map information read at step S2. Moreover, the brake control start distance L2 is a distance set to the traveling lane 101a with the target spot as a reference and where the brake control for the lane change is started.

If the reaching distance L1 has not reached the brake control start distance L2 (L1>L2), the vehicle control calculator 23b exits the routine without doing anything. After that, when the reaching distance L1 has reached the brake control start distance L2 (L1≤L2), the routine proceeds to step S13, the lane change control for starting the lane change to the branch lane 102 is executed, and the vehicle control calculator 23b exits the routine.

The lane change control executed by the vehicle control calculator 23b is such that when the own vehicle M has reached the brake control start distance L2, first, a left blinker (not illustrated) is made to flicker and then, the brake controller 32 and the acceleration/deceleration controller 33 are operated, and the own vehicle M is decelerated to the vehicle speed at which the lane change can be performed at the target spot (L1=0). Then, the acceleration/deceleration controller 33 and the steering controller 31 are operated, and the own vehicle M is made to travel along the target travel path in the branch lane 102 direction. After the lane change control is finished, the ordinary automatic driving is performed along the target travel path.

When it is determined at step S11 that the lane restricted section 103a is set to the traveling lane 101a before the entrance of the branch lane 102 and the routine branches to step S14, whether the reaching distance L1 from the own vehicle M to the target spot has reached a lane change start distance L3 to the passing lane 101b is examined. As illustrated in FIG. 9, the target spot is set to the start position of the lane restricted section 103a, and the lane change start distance L3 may have a fixed value (100 to 200 [m], for example) set with the target spot as a reference, or may be a variable value set based on the vehicle speed of the own vehicle M. Note that the start position of the lane restricted section 103a is obtained from the road map information read at step S2.

If the reaching distance L1 has not reached the lane change start distance L3 (L1>L3), the vehicle control calculator 23b exits the routine without doing anything. After that, when the reaching distance L1 has reached the lane change start distance L3 (L1≤L3), the routine proceeds to step S15, and the lane change control for starting the lane change to the passing lane 101b is executed, and the vehicle control calculator 23b exits the routine. The lane change control is a series of control from the blinker flickering time before the lane change to the completion of the lane change to the passing lane 101b.

That is, the vehicle control calculator 23b causes the blinker on the passing lane 101b side to flicker for predetermined time (3 seconds, for example) in a state where the own vehicle M is traveling on the traveling lane 101a so as to notify the peripheral vehicles of the lane change and then, the vehicle control calculator 23b transmits a control signal for the own vehicle M to change the lane to the passing lane 101b side to each of the controllers 31 to 33 and causes the own vehicle M to change the lane. Note that a reference character M' in FIG. 9 indicates the own vehicle after the lane change. Note that the processing at steps S12 and S13, steps S14 and S15, and steps S28 to S31 which will be described later correspond to the lane change controller of the technology.

On the other hand, if it is determined at step S10 that the own vehicle M is traveling on a lane (the passing lane 101b in FIG. 9) other than the traveling lane 101a and the routine branches to step S16, whether the reaching distance L1 has reached a lane change start distance L4 to the branch lane 102 side is examined. The lane change start distance L4 is a distance required for the blinker flickering time before the lane change and the control until the completion of the lane change by each of the controllers 31 to 33 on the lane (passing lane 101b in FIG. 9) on which the own vehicle (M') is traveling.

At that time, if the branch lane 102 side is not jammed as illustrated in FIG. 9A, the lane change start distance L4 is set based on the current vehicle speed, a distance required for the lane change for each lane, and a target vehicle speed at the target spot, with the predetermined target spot set to the entrance of the branch lane 102 as a lane change completion position. As illustrated in FIG. 9B, if the periphery of the entrance of the branch lane 102 is jammed, the lane change start distance L4 is set, with the position of the vehicle (Pe) at the end as a reference, to a distance that allows the own vehicle to halt with the following inter-vehicle distance with respect to the vehicle (Pe), based on the current vehicle speed and the distance required for the lane change for each lane. The aforementioned target spot is set based on the road traffic information read at step S2. Moreover, the position of the vehicle (Pe) at the end of the traffic jam is set based on the road traffic information read at step S2 or the traveling environment image information obtained by the camera unit 21.

When the lane change is to be performed from the passing lane 101b to the branch lane 102, diagonally crossing of the traveling lane 101a is prohibited, and the lane change needs to be performed for each lane. As illustrated in FIGS. 9A and 9B, for example, when the lane change is to be performed from the passing lane 101b to the branch lane 102 direction, the traveling lane 101a needs to be passed. Therefore, first, the lane change control from the passing lane 101b to the traveling lane 101a is executed and then, the lane change control from the traveling lane 101a to the branch lane 102 is executed. Thus, a distance required for the lane change is added to the lane change start distance L4 for each passing lane.

If the reaching distance L1 has not reached the lane change start distance L4 yet (L1>L4), the vehicle control calculator 23b exits the routine without doing anything. On the other hand, if the reaching distance L1 has reached the lane change start distance L4 (L1≤L4), the routine proceeds to step S17. At step S17, whether entry of the own vehicle M to the branch lane 102 is possible is examined. Note that the processing at this step corresponds to a branch-lane entry determining unit of the technology.

As described above, since the lane change needs to be made for each lane, when the lane change from the passing lane 101b to the branch lane 102 is performed, the own vehicle M needs to travel on the traveling lane 101a once.

Figure 10:
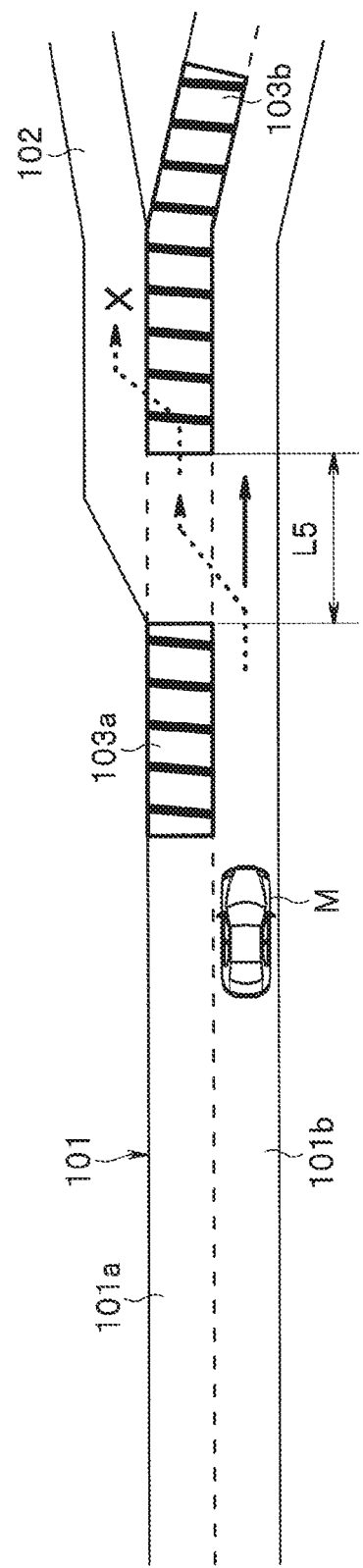
FIG. 10 is an explanatory view illustrating the traveling control if the lane change to the branch lane direction cannot be made when the lane restricted section is set in the vicinity of the entrance of the branch lane set as the target travel path.

Therefore, when the lane restricted sections 103a and 103b are set before and ahead of the entrance of the branch lane 102 as illustrated in FIGS. 9A and 9B, if the set interval L5 is longer than a value obtained by adding an allowance distance to the distance required for the lane change (hereinafter, "required lane change distance"), entry to the branch lane 102 is possible. On the other hand, if the set interval L5 is shorter than the required lane change distance as illustrated in FIG. 10, the lane change by the automatic driving becomes difficult. Note that the required lane change distance is set based on the target vehicle speed at the entry to the branch lane 102. Therefore, if the target vehicle speed is a fixed value, the distance required for the lane change is also a fixed value. Moreover, the set interval L5 is calculated from the road traffic information read at step S2 or the traveling environment image information obtained by the camera unit 21.

When the required lane change distance is shorter than the set interval L5, it is determined that the entry of the own vehicle M to the branch lane 102 is possible, and the routine proceeds to step S18. If the required lane change distance is longer than the set interval L5, it is determined that the entry of the own vehicle M to the branch lane 102 direction is not possible, and the routine branches to step S22.

At step S18, the lane change control from the passing lane 101b to the branch lane 102 direction is executed, and the routine proceeds to step S19. In the lane change control executed by the vehicle control calculator 23b, first, the left blinker (not illustrated) is made to flicker and then, the steering controller 31, the brake controller 32, and the acceleration/deceleration controller 33 are operated, and the lane change to the traveling lane 101a is executed. Then, the left blinker (not illustrated) is made to flicker again, the steering controller 31, the brake controller 32, and the acceleration/deceleration controller 33 are operated, and the lane change to the branch lane 102 is executed.

After that, at step S19, whether the preceding vehicle Pe which is a target to be followed is detected on the branch lane 102 is examined. The detection of the preceding vehicle Pe is made based on the traveling environment image information obtained by the camera unit 21. If it is determined that the preceding vehicle Pe to be followed is not detected, the routine proceeds to step S20, the lane change control is finished, and the vehicle control calculator 23b exits the routine. As a result, the ordinary automatic driving for making the own vehicle travel along the target travel path is performed.

As described above, even if the target travel path of the own vehicle M is set to the branch lane 102 direction from the traveling lane 101a and the lane restricted section 103a is set on the target travel path before the branch lane 102, the lane restricted section 103a can be detoured in a state where the automatic driving is continued, and the own vehicle M can be smoothly led to the branch lane 102 direction. Since detour control is executed without stopping the automatic driving, cumbersomeness felt by the driver can be alleviated.

If it is determined that the preceding vehicle Pe which is a target to be followed is detected at step S19, the routine proceeds to step S21, the ACC control is executed, and the vehicle control calculator 23b exits the routine.

On the other hand, if it is determined at step S17 that the entry to the branch lane 102 direction is difficult and the routine branches to step S22, the automatic driving is stopped, and the routine proceeds to step S23. At step S23, an instruction to regenerate a travel route from the current position of the own vehicle M to the destination (if the transit point is set, the destination going through the transit point) is transmitted to the map locator calculator 12, and the routine proceeds to step S24.

At step S24, a driving mode is switched to the driving assist by the ALK control and the ACC control, and the routine proceeds to step S25. When the driving mode is switched from the automatic driving to the driving assist, the switching of the driving mode is notified and an instruction to hold the steering wheel is given by the notification device 34 to the driver. The processing at steps S22 to S24 corresponds to the driving assist unit of the technology.

When the driving mode is switched to the driving assist (ALK control, ACC control), the vehicle control calculator 23b recognizes lane lines which mark the left and right of the passing lane 101b (see FIG. 10) on which the own vehicle M is currently traveling based on the traveling environment image information obtained by the camera unit 21 and transmits a control signal to each of the controllers 31 to 33 so that the own vehicle M travels on the center of the left and right lane lines (ALK control).

When the preceding vehicle Pe is detected, the following traveling is performed in a state where the predetermined inter-vehicle distance is maintained, while if the preceding vehicle Pe is not detected, the own vehicle M travels at the set vehicle speed (ACC control). Note that after the own vehicle passes the lane restricted section 103b, the lane change to the traveling lane 101a can be made by the steering wheel operation of the driver. In this case, the vehicle control calculator 23b may automatically execute the lane change by the driver indicating the intention of the lane change by flickering of the blinker on the traveling lane side.

At step S25, the processing at step S24 is repeatedly executed until a new travel route is generated by the map locator calculator 12, and when the new travel route is generated, the vehicle control calculator 23b exits the routine. When the new travel route is generated, the vehicle control calculator 23b notifies the driver that the automatic driving is resumed by the notification device 34 and then, switches the driving mode to the automatic driving.

If it is determined that the target travel path has passed the branch lane 102 and is set to the straight traveling direction at the aforementioned step S3 and the routine branches to step S26, whether the target travel path ahead is jammed is examined based on the road traffic information read at step S2 or the traveling environment image information obtained by the camera unit 21. If the traffic jam is not detected, the vehicle control calculator 23b exits the routine without doing anything.

As described above, when the lane restricted sections 103a and 103b are set on the traveling lane 101a at the entrance to the branch lane 102 and the set interval L5 is shorter than the required lane change distance in which the own vehicle M is to change the lane to the branch lane 102 direction by the automatic driving, the automatic driving is temporarily stopped, and the driving mode is switched to the driving assist (ALK control, ACC control) for straight traveling on the passing lane 101b and thus, the traveling of the own vehicle M can be continued by the driving assist, and favorable driving performances can be obtained.

On the other hand, when the traffic jam is detected, the routine proceeds to step S27. At step S27, whether the traffic jam extends from the branch lane 102 side is examined based on the road traffic information read at step S2. If the traffic jam occurs in the branch lane 102 direction, the routine proceeds to step S28. On the other hand, if the traffic jam occurs on the main lane 101, the routine returns to step S5, and the traffic-jam adaptive cruise control with the vehicle at the end of the traffic jam as the preceding vehicle Pe is executed.

At step S28, whether the reaching distance L1 to the target position of the own vehicle M has reached the lane change start distance L3 to the adjacent lane (passing lane 101b) is examined. The target value is the vehicle (Pe) at the end of the traffic jam. The lane change start distance L3 may have a fixed value (100 to 50 [m], for example), or may be a variable value set based on the vehicle speed of the own vehicle M. The position of the vehicle (Pe) at the end of the traffic jam is acquired based on the road traffic information read at step S2. However if the position of the vehicle (Pe) can be acquired from the traveling environment image information obtained by the camera unit 21, the distance from the vehicle (Pe) to the own vehicle M is calculated based on the latest traveling environment image information.

If the reaching distance L1 has not reached the lane change start distance L3 yet (L1>L3), the vehicle control calculator 23b exits the routine without doing anything. On the other hand, when the reaching distance L1 has reached the lane change start distance L3 (L1≤L3), the routine proceeds to step S29.

At step S29, the lane change control to the adjacent lane (passing lane 101b) is executed, and the routine proceeds to step S30. In the lane change control executed by the vehicle control calculator 23b, first, the blinker on the passing lane 101b side is made to flicker for predetermined time (3 seconds, for example) so as to notify the peripheral vehicles of the lane change and then, a control signal for the own vehicle M to change the lane to the passing lane 101b side is transmitted to each of the controllers 31 to 33 so as to cause the lane change to be performed, and the own vehicle M is made to travel on the passing lane 101b (the arrow r1 in FIG. 11).

Subsequently, the routine proceeds to step S30, and whether the own vehicle has passed through the traffic jam row extending to the main lane 101 during the traveling on the passing lane 101b is examined based on the traveling environment image information obtained by the camera unit 21. Then, the processing at step S29 is repeatedly executed until the own vehicle passes through the traffic jam row, and after the own vehicle has passed through the traffic jam row, the routine proceeds to step S31. At step S31, the lane change control for returning the own vehicle M from the passing lane 102 to the original lane (traveling lane 101a) is executed, and the vehicle control calculator 23b exits the routine.

In the lane change control executed by the vehicle control calculator 23b, first, the blinker on the traveling lane 101a side is made to flicker for predetermined time (3 seconds, for example) and then, a control signal for the own vehicle M to change the lane to the traveling lane 101a side is transmitted to each of the controllers 31 to 33 so as to cause the lane change to be performed (an arrow r2 in FIG. 11). After the lane change to the traveling lane 101a is completed, the automatic driving along the target travel path set in advance is resumed.

As a result, since detour routes r1 and r2 for traveling on the passing lane 101b are automatically set for the original target travel path set to the traveling lane 101a indicated by the one-dot chain line in FIG. 11, the traffic jam is detoured, and the automatic driving can be continued without stopping the automatic driving.

The technology is not limited to the aforementioned embodiment, but it may be so configured that when traffic jam on the branch lane 102 is detected at step S4, for example, a flow of the traffic jam row is calculated based on the road traffic information, the map locator calculator 12 is made to generate a new travel route having passed the branch lane 102, and a travel route having an earlier arrival time at the destination (or a transit point) is selected as the travel route.

Each of the map locator calculator 12, the forward traveling environment recognizer 21d, and the vehicle controller 23 illustrated in FIG. 2 can be implemented not only by the aforementioned microcomputer but also by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the map locator calculator 12 including the local dynamic map setting/updating unit 12a, the own vehicle location estimation calculator 12b, the travel route/target travel path setting calculator 12c, the road map information acquirer 12d, and the vehicle controller 23 including the road traffic information acquirer 23a and the vehicle control calculator 23b. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 2.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

According to the technology, when it is determined that the target travel path is set to the branch lane direction and the lane restricted section is set before the entrance of the main lane, the traveling controller causes the own vehicle to change the lane to the adjacent lane before the lane restricted section starts and thus, the own vehicle can detour the lane restricted section and can be smoothly led to the branch lane direction without stopping the automatic driving.

As a result, cumbersomeness felt by the driver can be alleviated.

When it is determined that the traffic jam from the branch lane extends to the main lane, the following control is executed on the own vehicle with the vehicle at the end of the traffic jam as the preceding vehicle. Therefore, even in the case where the traffic jam from the branch lane extends to the main lane, the vehicle at the end of the traffic jam can be followed without stopping the automatic driving and thus, cumbersomeness felt by the driver can be alleviated.

The invention claimed is:

1. An automatic driving assist apparatus comprising:
    a traveling environment information acquiring unit configured to be mounted on an own vehicle and obtain traveling environment information ahead of the own vehicle;
    a map locator calculator configured to set a target travel path;
    a traffic information acquiring unit configured to obtain, from an external traffic control apparatus, road traffic information of the target travel path in order to cause the own vehicle to automatically travel, and
    a traveling controller configured to execute traveling control for causing the own vehicle to travel along the target travel path,
    the traveling controller comprising:
    a travel path determining unit configured to examine whether the target travel path is set to a branch lane direction from a main lane;
    a lane restriction determining unit configured to examine whether a lane restricted section is set to the main lane before an entrance of the branch lane, on a basis of the traveling environment information obtained by the traveling environment information acquiring unit or the road traffic information obtained by the traffic information acquiring unit, wherein the own vehicle is required to detour the lane restricted section;
    a traffic jam determining unit configured to examine whether the traffic jam from the branch lane extends to the main lane, on the basis of the traveling environment information obtained by the traveling environment information acquiring unit or the road traffic information obtained by the traffic information acquiring unit;
    a lane change controller configured to cause the own vehicle to change the lane to an adjacent lane before the lane restricted section starts when the travel path determining unit determines that the target travel path is set to the branch lane direction, and the lane restriction determining unit determines that the lane restricted section is set before the entrance of the branch lane; and
    a traffic-jam following controller configured to cause the own vehicle to execute following control with a vehicle at an end of the traffic jam as a preceding vehicle when the traffic jam determining unit determines that the traffic jam from the branch lane extends to the main lane.

2. The automatic driving assist apparatus according to claim 1, wherein the traveling controller further comprises a branch-lane entry determining unit configured to determine whether entry to the branch lane direction is possible when the lane change controller causes the own vehicle to change the lane to an adjacent lane and then, to pass the lane restricted section and to change the lane to the branch lane direction.

3. The automatic driving assist apparatus according to claim 2, wherein the traveling controller further comprises a driving assist unit configured to stop the automatic driving and maintain traveling on the lane on which the own vehicle is traveling on the basis of the traveling environment information obtained by the traveling environment information acquiring unit when the branch-lane entry determining unit determines that the entry to the branch lane direction is not possible.

4. The automatic driving assist apparatus according to claim 2, wherein in the following control executed by the traffic jam following controller, after brake control that forcibly decelerates the own vehicle is executed, steering control is executed toward a rear of a vehicle at the end of the traffic jam.

5. The automatic driving assist apparatus according to claim 1, wherein in the following control executed by the traffic jam following controller, after brake control that forcibly decelerates the own vehicle is executed, steering control is executed toward a rear of a vehicle at the end of the traffic jam.

6. The automatic driving assist apparatus according to claim 1, wherein when the travel path determining unit determines that the target travel path has passed the branch lane and is set to the main lane direction, and the traffic jam determining unit determines that the main lane continuing to the branch lane is jammed, the lane change controller causes the lane change to the adjacent lane to be performed before the end of the traffic jam.

7. An automatic driving assist apparatus comprising circuitry configured to be mounted on an own vehicle, to obtain traveling environment information ahead of the own vehicle, to set a target travel path, to obtain, from an external traffic control apparatus, road traffic information of the target travel path in order to cause the own vehicle to automatically travel, and to execute traveling control for causing the own vehicle to travel along the target travel path, the circuitry being configured to:

examine whether the target travel path is set to a branch lane direction from a main lane;

examine whether a lane restricted section is set to the main lane before an entrance of the branch lane, on a basis of the traveling environment information or the road traffic information;

examine whether the traffic jam from the branch lane extends to the main lane, on the basis of the traveling environment information or the road traffic information; and cause the own vehicle to change the lane to an adjacent lane before the lane restricted section starts, when the circuitry determines that the target travel path is set to the branch lane direction and that the lane restricted section is set before the entrance of the branch lane, and cause the own vehicle to execute following control with the vehicle at an end of the traffic jam as a preceding vehicle when the circuitry determines that the traffic jam from the branch lane extends to the main lane, wherein the own vehicle is required to detour the lane restricted section.

* * * * *